(12) United States Patent
Vaucher et al.

(10) Patent No.: US 8,401,599 B2
(45) Date of Patent: *Mar. 19, 2013

(54) SUPERCONDUCTING AC GENERATOR

(75) Inventors: Alexander R. Vaucher, Chino Hills, CA (US); Michael P. Miller, Chino Hills, CA (US)

(73) Assignee: Vaucher Aerospace Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/171,052

(22) Filed: Jun. 28, 2011

(65) Prior Publication Data

US 2012/0046174 A1 Feb. 23, 2012

Related U.S. Application Data

(60) Provisional application No. 61/375,784, filed on Aug. 20, 2010.

(51) Int. Cl.
*F16C 39/06* (2006.01)
(52) U.S. Cl. ........................................ 505/166
(58) Field of Classification Search .................. 505/166, 505/211
See application file for complete search history.

(56) References Cited

U.S. PATENT DOCUMENTS

| | | | |
|---|---|---|---|
| 2,725,474 A | 11/1955 | Ericsson et al. | |
| 3,188,579 A | 6/1965 | Meiklejohn | |
| 3,363,200 A | 1/1968 | Jaklevic et al. | |
| 4,901,038 A | 2/1990 | Dusclaux et al. | |
| 5,015,622 A | 5/1991 | Ward et al. | |
| 5,122,506 A | 6/1992 | Wang | |
| 5,126,317 A | 6/1992 | Agarwala | |
| 5,410,199 A | 4/1995 | Kinugasa et al. | |
| 5,559,384 A | 9/1996 | Boland et al. | |
| 5,805,036 A | 9/1998 | Hodge et al. | |
| 5,831,362 A | 11/1998 | Chu et al. | |
| 6,175,175 B1 | 1/2001 | Hull | |
| 6,231,011 B1 | 5/2001 | Chu et al. | |
| 6,762,522 B2 | 7/2004 | Steinmeyer | |
| 6,861,770 B2 | 3/2005 | Travers | |
| 6,876,877 B2 | 4/2005 | Eden | |
| 6,894,406 B2 | 5/2005 | Kinder | |
| 7,098,559 B2 | 8/2006 | Travers | |

*Primary Examiner* — Colleen Dunn
(74) *Attorney, Agent, or Firm* — Knobbe, Martens, Olson & Bear LLP (57) ABSTRACT

An alternating current (AC) generator and method of operating the generator are provided. The generator includes a pair of two opposing cylinders. Each cylinder includes a high-temperature superconductor material at a temperature. The superconductor material is in a superconducting state in the presence of an external magnetic field below a critical field strength, wherein the critical field strength is a function of the temperature of the superconductor material. A sum of a non-zero time-invariant magnetic field strength and a time-varying magnetic field strength cycles between at least a first field strength below the critical field strength for the superconductor material at the temperature and at least a second field strength above the critical field strength for the superconductor material at the temperature, such that the superconductor material cycles between a superconducting state and a non-superconducting state. The generator further includes a piston configured to move within the two cylinders. The piston includes a permanent magnet having a magnetic field that interacts with the superconductor material of each of the two opposing cylinders. A time-varying force is applied to the magnet by an interaction of the magnet's magnetic field with the superconductor material. The generator further includes a pickup coil positioned so that movement of the magnet induces an electrical current in the pickup coil.

17 Claims, 7 Drawing Sheets

SUPERCONDUCTING AC GENERATOR

CROSS-REFERENCE TO RELATED APPLICATIONS

The present application claims the benefit of priority to U.S. Provisional Appl. No. 61/375,784, filed Aug. 20, 2010, which is incorporated in its entirety by reference herein. The present application is related to the following U.S. patent applications, filed on even date herewith, and incorporated in their entireties by reference herein: U.S. patent application Ser. No. 13/171,062; U.S. patent application Ser. No. 13/171,071; U.S. patent application Ser. No. 13/171,060; U.S. patent application Ser. No. 13/171,074; and U.S. patent application Ser. No. 13/171,016.

BACKGROUND

1. Field of the Invention

The present invention relates generally to generators utilizing superconductivity.

2. Description of the Related Art

The phenomenon of superconductivity was discovered in 1911 in the Netherlands by Kamerlingh Onnes and collaborators (see, H. K. Onnes, Commun. Phys. Lab. University of Leiden, Suppl., 34b (1913)). Since that time, it has been exploited for many applications.

The phenomenon of superconductivity is one of the most amazing physical phenomena discovered thus far. It falls under a larger category of physical phenomenon known collectivity as "critical phenomenon," "phase transitions," or "correlated systems." Substances that exhibit these phenomena undergo a transformation that affects their physical properties on a macroscopic scale in a dramatic and observable way. This radical change in behavior usually occurs at a particular temperature called the "critical temperature." The onset of the transitions are predictable and are accompanied by a highly correlated behavior below the critical temperature, for the electrons in the substance, as in the case of superconductors, or for the particles making up the substance as in the case of superfluids. For a general discussion of critical phenomenon, see Tinkham, M. *Introduction to Superconductivity*, $2^{nd}$ ed., McGraw-Hill, (1996). The phenomenon of superconductivity is discussed herein and a certain property of its behavior is identified for its useful potential applications in certain embodiments described herein (e.g., for oscillators, sensors, generators, and motors).

As mentioned above, superconductivity is one of the many manifestations of critical phenomenon known in physics. Superconductivity is characterized by the complete absence of electrical resistance in a substance below the critical temperature. Not all materials exhibit superconductivity. Known superconductors include some metals or alloys of metals, which become superconducting at temperatures around 4 to 30 degrees Kelvin. More recently, certain ceramic materials have been discovered that exhibit superconductivity at a relatively high temperature around 93 degrees Kelvin (see, Bendorz, J. G., Müller, K. A., Z. Phys. B64, 189 (1986)). This is particularly useful as it can be conveniently attained using liquid nitrogen which is at 77 degrees Kelvin. This class of "high temperature superconductors" (HTS) has opened up a whole new avenue of possibilities of superconductivity; however, this technology remains largely undeveloped.

SUMMARY

In certain embodiments, an alternating current (AC) generator is provided. The generator comprises a pair of two opposing cylinders. Each cylinder comprises a high-temperature superconductor material at a temperature. The superconductor material is in a superconducting state in the presence of an external magnetic field below a critical field strength, wherein the critical field strength is a function of the temperature of the superconductor material. Each cylinder further comprises a first superconducting coil configured to apply a non-zero time-invariant magnetic field strength to the superconductor material. Each cylinder further comprises a second superconducting coil configured to apply a time-varying magnetic field strength to the superconductor material. A sum of the non-zero time-invariant magnetic field strength and the time-varying magnetic field strength cycles between at least a first field strength below the critical field strength for the superconductor material at the temperature and at least a second field strength above the critical field strength for the superconductor material at the temperature, such that the superconductor material cycles between a superconducting state and a non-superconducting state. The generator further comprises a piston configured to move within the two cylinders. The piston comprises a permanent magnet having a magnetic field that interacts with the superconductor material of each of the two opposing cylinders. A time-varying force is applied to the magnet by an interaction of the magnet's magnetic field with the superconductor material. The generator further comprises a pickup coil positioned so that movement of the magnet induces an electrical current in the pickup coil.

In certain embodiments, a method of operating a generator is provided. The method comprises providing a generator comprising a pair of two opposing cylinders. Each cylinder comprises a high-temperature superconductor material at a temperature. The superconductor material is in a superconducting state in the presence of an external magnetic field below a critical field strength, wherein the critical field strength is a function of the temperature of the superconductor material. Each cylinder further comprises a first superconducting coil configured to apply a non-zero time-invariant magnetic field strength to the superconductor material. Each cylinder further comprises a second superconducting coil configured to apply a time-varying magnetic field strength to the superconductor material. A sum of the non-zero time-invariant magnetic field strength and the time-varying magnetic field strength cycles between at least a first field strength below the critical field strength for the superconductor material at the temperature and at least a second field strength above the critical field strength for the superconductor material at the temperature, such that the superconductor material cycles between a superconducting state and a non-superconducting state. The generator further comprises a piston configured to move within the two cylinders. The piston comprises a permanent magnet having a magnetic field that interacts with the superconductor material of each of the two opposing cylinders. A time-varying force is applied to the magnet by an interaction of the magnet's magnetic field with the superconductor material. The generator further comprises a pickup coil positioned so that movement of the magnet induces an electrical current in the pickup coil. The method further comprises applying the non-zero time-invariant magnetic field strength to the superconductor material of each of the cylinders by using the first superconducting coil of each of the cylinders. The method further comprises applying a time-varying force to the magnet which moves the magnet by using the second superconducting coil of each of the cylinders to apply the time-varying magnetic field strength to the superconductor material of each of the cylinders, such that the superconductor material of each of the cylinders cycles between a superconducting state and a non-superconducting state. The method further comprises using the magnet to induce an electric current in the pickup coil.

DETAILED DESCRIPTION

In certain embodiments described herein, a new oscillator based on the phenomenon of superconductivity is realized and identified for its many potential applications (e.g., oscillators, sensors, generators, and motors). This oscillator is based on the Meissner Effect of superconductivity, and is used to create a "Superconducting Oscillator" that can be used to apply a time-varying force to a magnet, which has many potential applications among which are motors of all types, and various sensors. Certain embodiments described herein exploit one property which has many potential applications (e.g., in oscillators, sensors, generators, and motors).

Figure 1A:
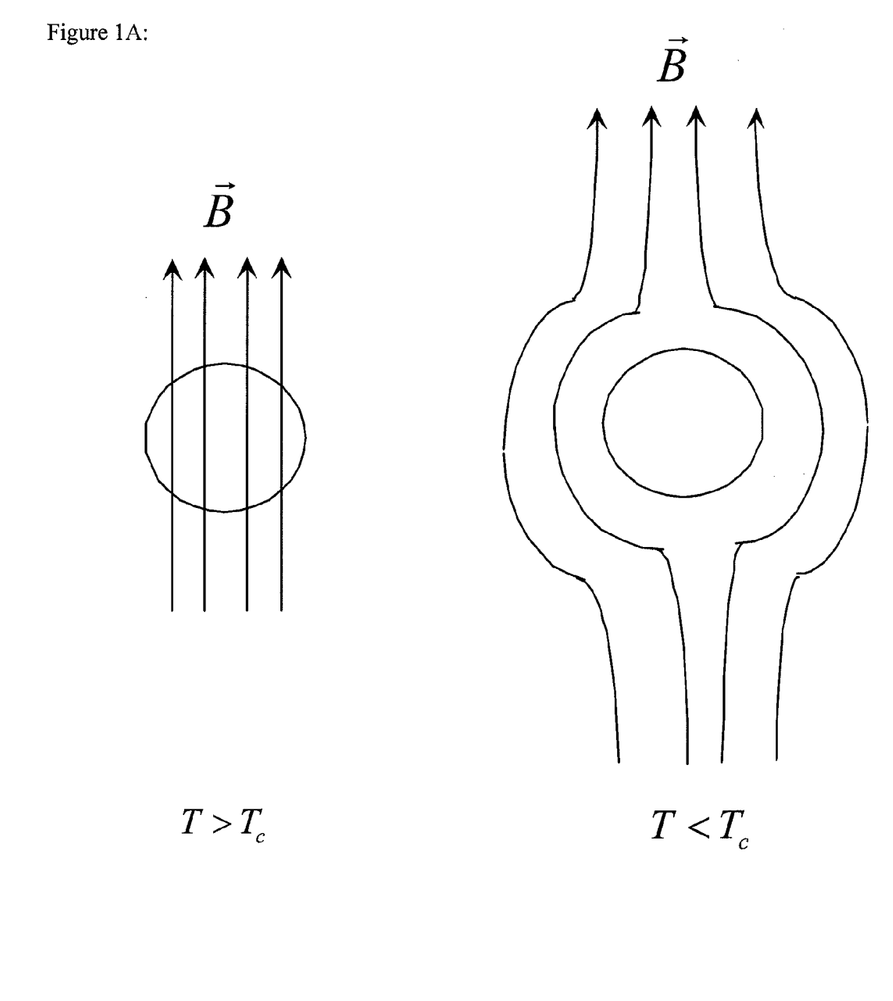
FIG. 1A schematically illustrates a superconductor material at a temperature greater than the critical temperature immersed in an external magnetic field then cooled below its critical temperature.
Figure 1B:
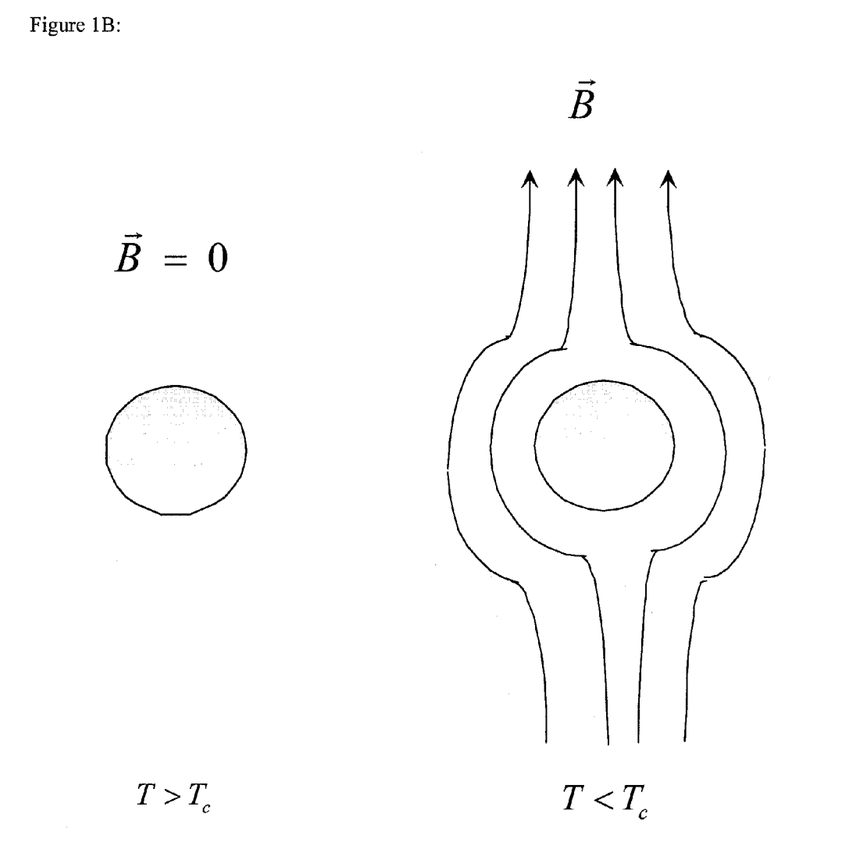
FIG. 1B schematically illustrates a superconductor material at a temperature greater than the critical temperature in zero external magnetic field then cooled below its critical temperature.
Figure 2:
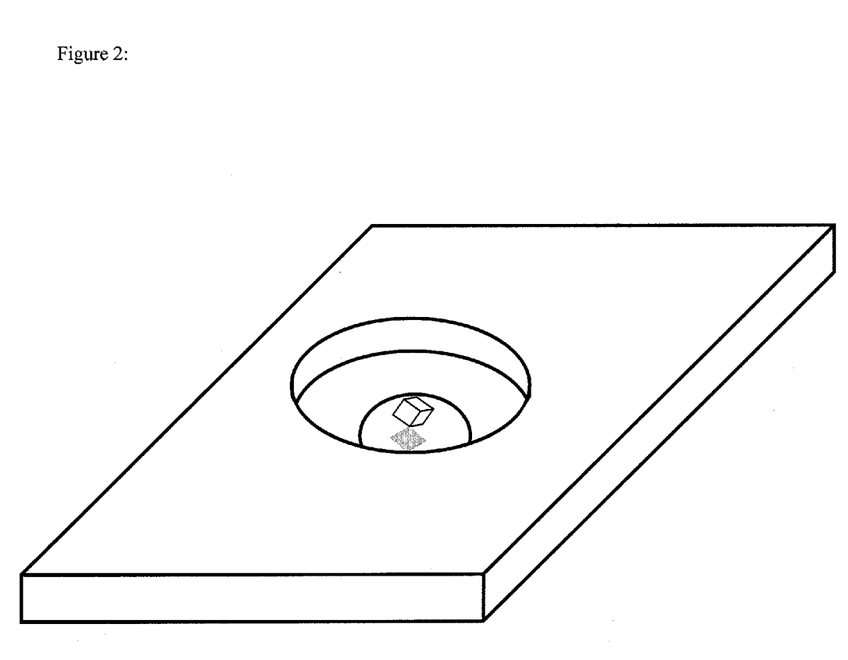
FIG. 2 schematically illustrates a small permanent magnet floating above a superconductor material that is below its critical temperature.

The absence of electrical resistance is only one of the properties exhibited by superconductors below the critical temperature. Another very striking effect is the Meissner Effect, named after W. Meissner (see, W. Meissner, R. Ochsenfeld, Naturwiss, 21: 787 (1933)). It was observed that when a superconducting material is cooled in the presence of a magnetic field, when the temperature dropped below the critical temperature, the magnetic field was expelled from the superconductor, as shown schematically in FIG. 1A. This is because the superconductor acts as a perfect diamagnet, expelling the magnetic field. The mechanism by which this occurs is simple; the external magnetic field induces currents in the superconductor. These currents circulate in such a way as to generate a magnetic field that opposes the external field, thus the net field in the superconductor is zero. The same effect also occurs if the magnetic field is introduced after the superconductor is cooled below its critical temperature, as shown in FIG. 1B. This property has the striking effect of causing the superconductor to repel the source of the external magnetic field. FIG. 2 schematically illustrates this phenomenon using a small permanent magnet floating above a superconductor that is below its critical temperature due to the force applied to the magnet by the interaction of its magnetic field with the superconducting material opposing the force of gravity on the magnet. In FIG. 2, the magnet is Neodymium type, the superconductor is ceramic HTS type, YBCO cooled to liquid nitrogen temperature.

Figure 3:
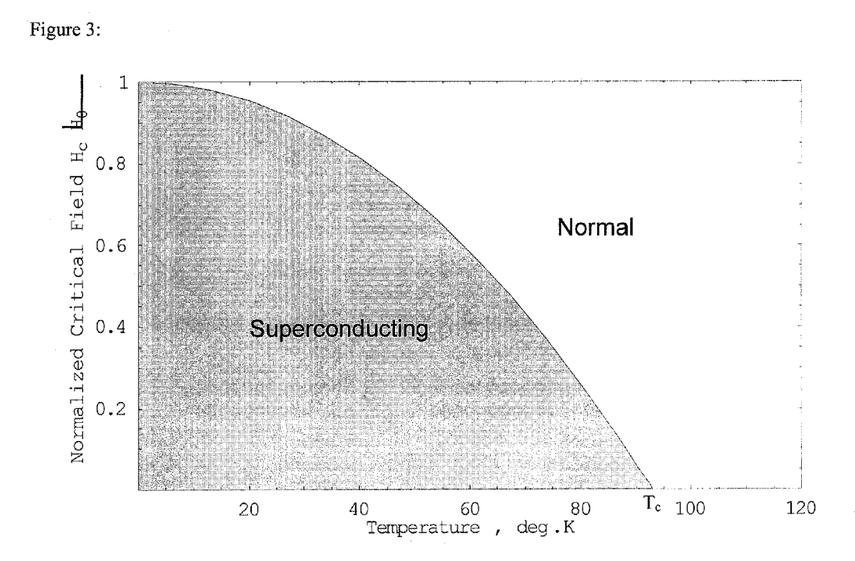
FIG. 3 is a plot of normalized critical field versus temperature for YBCO high temperature superconductor material having a critical temperature at about 93 degrees Kelvin. The region below the curve is the superconducting state, and the region outside the curve is the normal or non-superconducting state.

Superconductivity in the presence of an external magnetic field follows certain limitations. For a fixed temperature below the critical temperature, as the external magnetic field strength is increased, superconductivity is lost. The value of the magnetic field strength required to destroy the superconducting state generally increases as the operating temperature is lowered below the critical temperature. This phenomenon follows an empirical law (depicted in FIG. 3) in the form of:

$$H_c(T) = H_c(0)\left[1 - \left(\frac{T}{T_c}\right)^2\right] \quad (1)$$

FIG. 3 is a plot of normalized critical field strength versus temperature for YBCO high temperature superconductor material having a critical temperature at about 93 degrees Kelvin. The region below the curve is the superconducting state, and the region outside the curve is the normal or non-superconducting state. FIG. 3 shows that the superconducting region is confined inside the critical field strength curve. As the temperature changes above and below the critical temperature, the superconductor switches between the normal and superconducting states. This oscillation however is very slow, as the temperature change is slow in nature.

Figure 4:
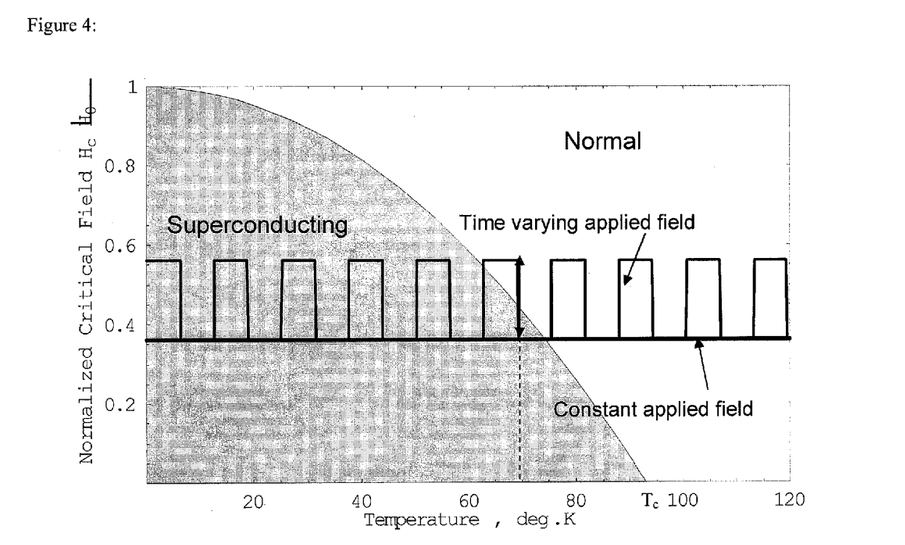
FIG. 4 is the plot of FIG. 3 with a plot of a time-varying external magnetic field applied at a specific temperature superimposed over the applied external time-invariant or constant magnetic field.
Figure 5:
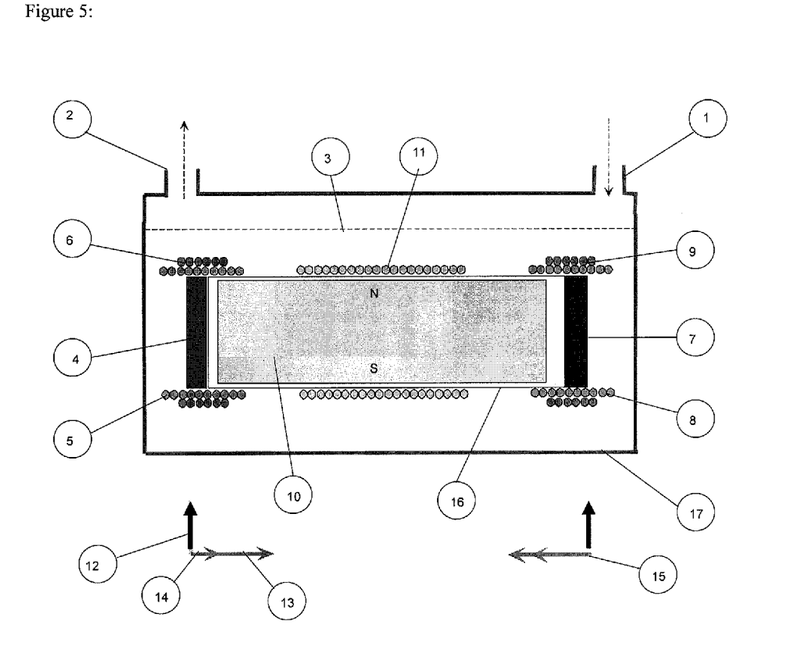
FIG. 5 schematically illustrates a superconducting AC generator in accordance with certain embodiments described herein.
Figure 6:
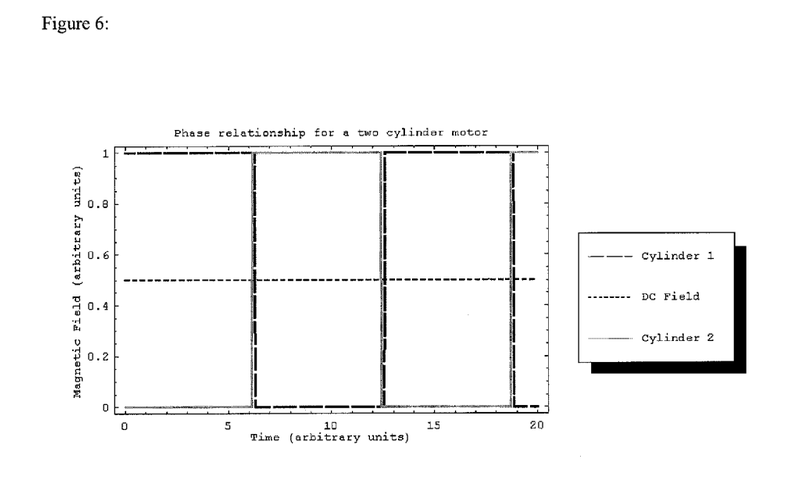
FIG. 6 illustrates the phase relationship between the magnetic fields in a two opposing cylinder generator.

The switch between the normal and superconducting states also occurs as the magnetic field strength is switched above or below the critical field strength. In this case, however, the oscillation is instantaneous, because the mechanism responsible is a second order phase transition. In certain embodiments, a convenient temperature can be chosen and a time-varying (e.g., oscillating) component field strength can be applied at the critical field strength value, as schematically illustrated in FIG. 4. Such a configuration will cause the superconductor material to oscillate between the normal and superconducting states at the frequency of the applied field. This in turn will impose a time-varying (e.g., periodic) behavior on the Meissner effect. Thus, a magnet floating above the superconductor will exhibit up and down oscillations at the frequency of the applied field. Since this change of state is virtually instantaneous at a particular fixed temperature, the oscillation of the superconductor will lag the applied field by the relaxation time for the superconductor. This is the time it takes to form the ordered state, in the femtosecond range, which is a very short time. This process is shown schematically in FIG. 4.

FIG. 4 is the plot of FIG. 3 with a plot of a time-varying external magnetic field strength applied to the material at a specific temperature superimposed over the applied external time-invariant or constant magnetic field strength. A time-varying external magnetic field strength (e.g., square wave, with zero minimum) applied at a specific temperature, and superposed over the applied external constant field strength, will force the material into the normal state region, thus destroying superconductivity. During the next half cycle, the total field strength is less than the critical field strength, and superconductivity is restored. The driving frequency is that of the applied field. The limiting frequency is due to the relaxation time for the superconductor, on the order of $10^{-15}$ seconds in certain embodiments. Since the relaxation time of the superconductor material is of the order of $10^{-15}$ seconds, the applied frequency can be very high, e.g., in the terahertz range. Most practical applications will be at much lower frequencies, e.g., in the Hz, kHz, MHz, or GHz ranges. For most mechanical applications, the frequency is likely to be in kHz range. The superconductor material lags the applied field by a phase factor of the order of the relaxation time. In FIG. 4, the driving field of the example oscillator is applied at about 70 degrees Kelvin, which is well below the critical temperature, utilizing DC external field strength of about 0.36 ($H_c/H_0$) where $H_0=H_c(0)$. In certain embodiments, the AC field strength can be applied anywhere on the critical field strength (e.g., at a point of low field strength, but not too close to the critical temperature).

In certain embodiments, the operating temperature is selected to be at or below 93 degrees Kelvin. The operating temperature of certain embodiments is chosen to be sufficiently below the critical temperature since near the critical temperature some instability could take place as the superconductor material transitions between states. As the temperature is chosen increasingly below the critical temperature, the required field strength to change states will increase. Therefore, it becomes a design trade-off issue which will be determined depending on the particular application (e.g., oscillators, sensors, generators, and motors) for a specific requirement. A helpful criterion for determining an appropriate operating temperature below the critical temperature is to know the error margin in the specific temperature control mechanism being used. For example, if a heater with a feedback loop is used that has a response of 0.5 degree Kelvin above or below a chosen operating temperature (set point), then this set point should be at least 0.5 degree Kelvin below the critical temperature. It is a good design practice to select an operating temperature that is two, three, or more times the error margin below the critical temperature (e.g., at least 2 to 5 degrees Kelvin).

As mentioned above, the superconducting state is destroyed if the superconductor is immersed in a strong magnetic field. This transition to the normal, non-superconducting state is quite rapid, unlike the transition which occurs at the critical temperature. The reverse is also true, when the strong field is reduced below the critical field value, the superconducting state returns just as rapidly. Making use of this phenomenon, the AC generator design of certain embodiments described herein is that of two opposing inline cylinders. FIG. 3 schematically illustrates an example design of an AC generator having two opposing inline cylinders. Each cylinder contains a superconductor material 4, 7 (e.g., disk or base), and the cylinders share a common piston 10, which comprises a permanent magnet with its magnetic field oriented (shown by arrow 12) such that is parallel to the surface, of the superconductor material 4, 7. Each cylinder comprises a coil 5, 8 wound around each of the cylinders, which can be referred to as the "primary" coil 5, 8. The primary coil 5, 8 of certain embodiments comprises a superconducting wire, and is maintained at a prescribed current and magnetic field strength. Besides the primary coil 5, 8, each cylinder comprises a secondary, smaller coil 6, 9 that are pulse driven and wound around the cylinder (e.g., around the primary coil 5, 8), with the secondary coil 6, 9 comprising a superconducting material or a non-superconducting material (e.g., copper) in certain embodiments. Each of the two cylinders shown in FIG. 3 is substantially identical to the other with its own set of primary and secondary coils.

The center housing 16 (e.g., tube) which houses the magnetic piston 10 is under vacuum in certain embodiments. In certain embodiments, the entire assembly is contained in a liquid nitrogen bath enclosed in a dewar 17 having a liquid nitrogen intake 1, a vent 2, and is filled with liquid nitrogen to level 3.

Around the center housing 16 is a pickup coil 11 which comprises high-temperature superconducting material in certain embodiments. The entire system in certain embodiments is cooled to liquid nitrogen temperature, and the primary coils 5, 8 are charged with enough current to bring them sufficiently below the critical field strength for the superconductor material 4, 7 to remain in the superconducting state. The secondary coil 6, 9 of one cylinder is energized, such that the sum of the primary and secondary field strengths will exceed the critical field strength, and the superconductor material 4, 7 will enter the normal or non-superconducting state. No repulsive force is generated in this cylinder, while a repulsive force is generated in the opposite cylinder causing the piston 10 to move towards the cylinder with the higher magnetic field strength. In the next half cycle, the secondary coil 6, 9 of the first cylinder is turned off, and the secondary coil 6, 9 of the opposing cylinder is energized causing a reversal of the initial state, the repulsion is now in the first cylinder and not in the second, causing the piston 10 to move in the opposite direction. As this cycle repeats, the magnetic piston 10 moves back and forth thus inducing a current in the pickup coil 11. The induced current will be alternating at the same frequency as the driving frequency between the two secondary coils 6, 9, but will lag slightly in phase. The phase lag is of the order of the relaxation time for the superconductor material 4, 7, and the mechanical response time of the piston 10, which is very small.

FIG. 4 shows an example operating cycle of the generator in accordance with certain embodiments described herein. The horizontal line at 0.5 depicts the primary DC field strength which is constant for both cylinders. When the pulsed field is on for cylinder 1, it is off for cylinder 2; thus the total magnetic field for cylinder 1 is greater than for cylinder 2. At this stage in the cycle, the superconductor material 4, 7 in cylinder 1 will be normal, non-superconducting state and producing no repulsion, while the superconductor material 4, 7 in cylinder 2 is in the superconducting state and produces a repulsion causing the piston 10 to move away from the superconductor material 4, 7. In the next half cycle the pulsed field is reversed: off for cylinder 1 and on for cylinder 2, thus cylinder 1 produces a repulsion, while cylinder 2 does not, and the piston 10 moves in the opposite direction. The motion of the magnetic piston 10 induces alternating current in the pickup coil 11.

Certain embodiments of the system described herein are configured to generate alternating current in the pickup coil 11, thus certain such embodiments are used primarily as an alternating current generator. The frequency of the generated current is the same as the frequency of the alternating pulsing of the secondary coils 4, 7. The advantage of certain embodiments of this device is that the pulsed fields are small thus using little energy input, but when combined with the field from the primary coil 5, 8, the resulting field is enough to put the superconductor material 4, 7 into the normal non-superconducting state. The Meissner effect in the opposing cylinder is now unopposed, and causes the magnetic piston 10 to move. This movement causes the induced current in the pickup coil 11. The work done by the superconductor material 4, 7 induces heat in the superconductor material 4, 7, this heat is removed at the expense of the liquid nitrogen. Thus the energy input into the system also includes the energy needed to make the liquid nitrogen in addition to the pulsed fields.

The efficiency of this device in certain embodiments is largely that of the superconductor material 4, 7, and thus should be very high.

The choice of the currents for the primary coil 5, 8 and secondary coil 6, 9 is a trade-off between the desired performance requirements, and the quality of the superconductor material. The current in the primary coil 5, 8 is selected to be sufficient to bring the applied field from that primary coil 5, 8 to within range of the critical field at the chosen operating temperature. The remaining field used to exceed the critical field is to be applied by the secondary coil 6, 9. The range of the current flowing through each coil is a particular design parameter. For example, if the critical field at some operating temperature is about 8 Tesla, the field from the primary coil 5, 8 can be set at 7 Tesla. This can be done by charging the primary coil 5, 8 accordingly to deliver 7 Tesla. The remaining 1 Tesla can be applied using the secondary coil 6, 9. In certain embodiments, the secondary coil 6, 9 is pulsed slightly above the critical field to ensure that the total field exceeds the critical field even accounting for slight temperature fluctuations. When the secondary coil 6, 9 is pulsed on and off in sequence, the Meissner effect takes place sequentially, and the piston 10 oscillates. The pulsed field is smaller than the primary field in certain embodiments to avoid pulsing a high current, since even superconductors exhibit some AC losses. The question of how to divide the current between the primary and secondary coils also depends on properties of the superconductor. Since the Meissner effect operates in presence of the field of the primary coil 5, 8, the superconductor critical current will be affected by the presence of this field. In general, critical currents diminish slightly with applied field for all superconductors to varying degrees. For well prepared YBCO, the reduction in critical current is small, and can be compensated for by choosing a smaller field of the primary coil 5, 8 as needed. This in turn will use a larger field from the secondary coil 6, 9, thus pulsing of slightly higher current.

The same trade-offs mentioned above apply to the pick-up coil 11, with the desired output being electrical energy in the form of AC voltage and current. The applied power in the secondary coils 6, 9 is amplified through the superconductor and appears as AC power at the output. The cost of this conversion is heat dissipation in the superconductor which is removed by the liquid nitrogen. Thus the input energy into the system is the energy used to liquefy the nitrogen, the energy to charge the primary coils 5, 8, and the energy to pulse the secondary coils 6, 9. Of these, the energy used in the secondary coil is the least amount. The output is the generated AC power. Under ideal circumstances, the output energy should equal the input energy. In reality the efficiency of this system will be less than 1, but is expected to be in the 0.9 to 0.99 range. Most electrical motors or generators efficiency is about 0.8.

Various embodiments have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. An alternating current (AC) generator comprising:
   a pair of two opposing cylinders, each cylinder comprising:
   a high-temperature superconductor material at a temperature, wherein the material is in a superconducting state in the presence of an external magnetic field below a critical field strength, wherein the critical field strength is a function of the temperature of the superconductor material;
   a first superconducting coil configured to apply a non-zero time-invariant magnetic field strength to the superconductor material; and
   a second superconducting coil configured to apply a time-varying magnetic field strength to the superconductor material, wherein a sum of the non-zero time-invariant magnetic field strength and the time-varying magnetic field strength cycles between at least a first field strength below the critical field strength for the superconductor material at the temperature and at least a second field strength above the critical field strength for the superconductor material at the temperature, such that the superconductor material cycles between a superconducting state and a non-superconducting state;
   a piston configured to move within the two cylinders, the piston comprising a permanent magnet having a magnetic field that interacts with the superconductor material of each of the two opposing cylinders, wherein a time-varying force is applied to the magnet by an interaction of the magnet's magnetic field with the superconductor material; and
   a pickup coil positioned so that movement of the magnet induces an electrical current in the pickup coil.

2. The generator of claim 1, wherein the superconductor material comprises YBCO high-temperature superconductor material.

3. The generator of claim 1, wherein the superconductor material is in a non-superconducting state without an external magnetic field strength being applied to the superconductor material when the temperature (T) is above a critical temperature ($T_c$), and the critical field strength ($H_c$) is a function of the temperature (T) given $$H_c(T) = H_c(0)\left[1 - \left(\frac{T}{T_c}\right)^2\right],$$

by where $H_c(0)$ is a critical field strength of the superconductor material at zero degrees Kelvin.

4. The generator of claim 1, wherein the superconductor material is at a temperature at or below liquid nitrogen temperature.

5. The generator of claim 1, wherein the superconductor material is at a temperature at or below 93 degrees Kelvin.

6. The generator of claim 1, wherein time-varying magnetic field strength has a square wave, and a zero minimum field strength.

7. The generator of claim 1, wherein the time-invariant magnetic field strength has a field strength equal to about 36% of a critical field strength of the material at zero degrees Kelvin.

8. The generator of claim 1, further comprising a dewar in thermal communication with the superconductor material of each cylinder, the dewar configured to contain liquid nitrogen to a level sufficient to cool the superconductor material of each cylinder to a temperature at or below liquid nitrogen temperature, the dewar comprising an inlet and a vent.

9. The generator of claim 1, wherein the material is in a non-superconducting state without an external magnetic field strength being applied to the superconductor material when the temperature (T) is above a critical temperature ($T_c$), and the critical field strength ($H_c$) is a function of the temperature (T) given by:

$$H_c(T) = H_c(0)\left[1 - \left(\frac{T}{T_c}\right)^2\right],$$

where $H_c(0)$ is a critical field strength of the superconductor material at zero degrees Kelvin.

10. A method of operating a generator, the method comprising:
   providing a generator as recited in claim 1;
   applying the non-zero time-invariant magnetic field strength to the superconductor material of each of the cylinders by using the first superconducting coil of each of the cylinders;
   applying a time-varying force to the magnet which moves the magnet by using the second superconducting coil of each of the cylinders to apply the time-varying magnetic field strength to the superconductor material of each of the cylinders, such that the superconductor material of each of the cylinders cycles between a superconducting state and a non-superconducting state; and
   using the magnet to induce an electric current in the pickup coil.

11. The method of claim 10, wherein the superconductor material comprises YBCO high-temperature superconductor material.

12. The method of claim 10, wherein the superconductor material is in a non-superconducting state without an external magnetic field strength being applied to the superconductor material when the temperature (T) is above a critical temperature ($T_c$), and the critical field strength ($H_c$) is a function of the temperature (T) given by:

$$H_c(T) = H_c(0)\left[1 - \left(\frac{T}{T_c}\right)^2\right],$$

where $H_c(0)$ is a critical field strength of the superconductor material at zero degrees Kelvin.

13. The method of claim 10, wherein the time-varying magnetic field strength is sequentially applied to the superconductor material of a first cylinder of the two cylinders and to the superconductor material of a second cylinder of the two cylinders.

14. The method of claim 10, wherein the superconductor material comprises YBCO high-temperature superconductor material.

15. The method of claim 10, wherein the superconductor material is at a temperature at or below liquid nitrogen temperature.

16. The method of claim 10, wherein the time-varying magnetic field strength has a square wave, and a zero minimum field strength.

17. The method of claim 10, wherein operation of the generator is cyclical and comprises at least a first cycle portion and a second cycle portion, wherein a first repulsive force between the magnet and the superconductor material of a first cylinder of the two cylinders is generated in the first cycle portion but not in the second cycle portion and a second repulsive force between the magnet and the superconductor material of a second cylinder of the two cylinders is generated in the second cycle portion but not the first cycle portion.

* * * * *